United States Patent
Grauer et al.

(10) Patent No.: US 10,390,004 B2
(45) Date of Patent: Aug. 20, 2019

(54) STEREO GATED IMAGING SYSTEM AND METHOD

(71) Applicant: BRIGHTWAY VISION LTD., Haifa (IL)

(72) Inventors: Yoav Grauer, Haifa (IL); Ofer David, Haifa (IL); Eyal Levi, Haifa (IL); Ya'ara David, Kiryat Tiv'on (IL); Haim Garten, Haifa (IL); Alon Krelboim, Haifa (IL); Sharon Lifshits, Haifa (IL); Oren Sheich, Yoqneam (IL)

(73) Assignee: BRIGHTWAY VISION LTD., Haifa (IL)

( * ) Notice: Subject to any disclaimer, the term of this patent is extended or adjusted under 35 U.S.C. 154(b) by 335 days.

(21) Appl. No.: 14/413,236

(22) PCT Filed: Apr. 4, 2013

(86) PCT No.: PCT/IL2013/050309
§ 371 (c)(1),
(2) Date: Jan. 7, 2015

(87) PCT Pub. No.: WO2014/009945
PCT Pub. Date: Jan. 16, 2014

(65) Prior Publication Data
US 2015/0296200 A1 Oct. 15, 2015

Related U.S. Application Data

(60) Provisional application No. 61/669,181, filed on Jul. 9, 2012.

(51) Int. Cl.
| | | |
|---|---|---|
| H04N 13/00 | (2018.01) | |
| H04N 13/254 | (2018.01) | |
| H04N 13/296 | (2018.01) | |
| G01S 17/89 | (2006.01) | |
| G01S 17/02 | (2006.01) | |

(Continued)

(52) U.S. Cl.
CPC .......... H04N 13/254 (2018.05); B60R 1/00 (2013.01); G01S 17/023 (2013.01);
(Continued)

(58) Field of Classification Search
CPC ........ H04N 5/0253; B60R 1/00; G01S 17/023
(Continued)

(56) References Cited

U.S. PATENT DOCUMENTS

| | | | |
|---|---|---|---|
| 4,862,257 A | 8/1989 | Ulich | |
| 5,270,780 A * | 12/1993 | Moran | G01S 17/107 |
| | | | 313/373 |

(Continued)

FOREIGN PATENT DOCUMENTS

| | | |
|---|---|---|
| CN | 171 0935 | 12/2005 |
| CN | 186 9731 | 11/2006 |

(Continued)

OTHER PUBLICATIONS

International Search Report of PCT Application No. PCT/IL2013/050309 dated Sep. 17, 2013.
(Continued)

*Primary Examiner* — Girumsew Wendmagegn
(74) *Attorney, Agent, or Firm* — Pearl Cohen Zedek Latzer Baratz LLP (57) ABSTRACT

A system for improving capturing of images of a scene, and data derived from them is provided herein. The system includes a light source configured to illuminate the scene with pulsed light at a specified direction based on predefined gating parameters; two or more capturing devices configured to capture images of the scene, each one of the capturing devices from at different spatial locations, wherein at least one of the capturing is synchronized with the pulsed light, so as to result in stereoscopic fused images of the scene for the synchronized capturing; and a computer processor config-
(Continued)

ured to improve the capturing by using data derived from the gated images and the gating parameters. In another embodiment, the light source is not present and at least one of the sensors' is configured to apply multiple exposures for a single readout, to yield enhanced images that are used to improve the capturing.

20 Claims, 4 Drawing Sheets

(51) Int. Cl.
  *G01S 17/10* (2006.01)
  *B60R 1/00* (2006.01)
  *G01S 7/499* (2006.01)
(52) U.S. Cl.
  CPC ............ *G01S 17/107* (2013.01); *G01S 17/89* (2013.01); *H04N 13/296* (2018.05); *B60R 2300/30* (2013.01); *G01S 7/499* (2013.01)
(58) Field of Classification Search
  USPC .......................................................... 348/42
  See application file for complete search history.

(56) References Cited

U.S. PATENT DOCUMENTS

| | | | | |
|---|---|---|---|---|
| 6,028,624 | A | * | 2/2000 | Watkins ................ B64D 47/04 348/117 |
| 6,100,517 | A | * | 8/2000 | Yahav ................. G01C 11/025 250/208.1 |
| 7,733,464 | B2 | | 6/2010 | David et al. |
| 2007/0058038 | A1 | * | 3/2007 | David ..................... G01S 7/483 348/135 |

FOREIGN PATENT DOCUMENTS

| | | |
|---|---|---|
| CN | 101 431 603 | 5/2009 |
| CN | 101 722 888 | 6/2010 |
| CN | 101 969 548 | 2/2011 |
| CN | 201 765 378 | 3/2011 |
| EP | 1831718 | 5/2011 |
| JP | 11-201740 | 7/1999 |
| JP | 2010-148130 | 7/2010 |
| JP | 2010-170449 | 8/2010 |
| JP | 2011-64498 | 3/2011 |
| JP | 2012-022573 | 2/2012 |
| WO | WO 02/41031 | 5/2002 |

OTHER PUBLICATIONS

Office action of JP patent application No. 2015-521142, dated Apr. 25, 2017.
Office action of KR patent application No. 10-2015-7003451, dated Feb. 8, 2018.
Office action of CN Application No. 2013800367368, dated May 16, 2016.

* cited by examiner

STEREO GATED IMAGING SYSTEM AND METHOD

CROSS-REFERENCE TO RELATED APPLICATIONS

This application is a National Phase Application of PCT International Application No. PCT/IL2013/050309, International Filing Date Apr. 4, 2013, claiming priority of U.S. Patent Application No. 61/669,181, filed Jul. 9, 2012, which are hereby incorporated by reference.

BACKGROUND

1. Technical Field

The present invention relates to the field of imaging and ranging system, and, more particularly, to stereo imaging at daytime, nighttime and harsh weather conditions by active gated imaging.

2. Discussion of Related Art

Stereo imaging is widely used by automotive manufactures for Advance Driver Assistance Systems (ADAS) functions such as night vision support, traffic sign recognition, object recognition lane recognition and the like. Stereo imaging provides two main advantages versus a single camera: at least two different scene imagery (i.e. captured by the cameras in different location in the vehicle and each camera may have different electro-optical characteristics such as Field-of-View, sensitivity etc.) and the second is three-dimensional information (i.e. ranging capabilities, stereoscopy) by triangulation.

European Patent No. EP 1,831,718 B1, titled "stereo camera for a motor vehicle" describes a device based on at least two cameras being different from each other with respect to at least one property such as light sensitivity, pixel dimensions, color filter array etc. Furthermore, the aforementioned device implements ADAS functions such as night vision support and/or traffic sign recognition and/or object recognition and/or road boundary recognition and/or lane recognition and the like. However, the aforementioned device does not address several important aspects such as the need for a dedicated Near-IR (NIR) light source for night vision support, does not address motor vehicle external installation and not addressing backscattering due to vehicle light source (e.g. front headlamps, night vision support NIR light source etc.) interaction with particles in the atmosphere such as rain, snow, hail etc. Furthermore, the aforementioned device does not simplify installation requirements of the cameras (required for three-dimensional information, e.g., by triangulation).

Accuracy of passive stereoscopy (i.e. three-dimensional information based on triangulation) depth information may be estimated by Eq. (1).

$$\Delta d = \frac{d^2}{l \cdot h} \Delta x \quad (1)$$

Whereas $\Delta d$ is the depth information estimation, d is the depth, l is the length of the baseline (i.e. distance between the cameras), h is the distance between the image plane and the plane through the centers of the central projection of the two cameras and $\Delta x$ is the disparity (i.e. sum of distances from for each camera center to a projected specific point in the viewed scenery). This depth information estimation limits every passive stereoscopy based system, namely at longer viewed distances and when baseline is limited to short lengths.

BRIEF SUMMARY

According to some embodiments of the present invention, there is provided a system for improving a capturing process of images of a scene, and data derived therefrom, the system includes: a light source configured to illuminate the scene with pulsed light at a specified direction based on predefined gating parameters; two or more capturing devices configured to capture images of the scene, each one of the capturing devices from at different spatial locations, wherein at least one of the capturing is synchronized with the pulsed light, so as to result in stereoscopic fused gated images of the scene for the synchronized capturing; and a computer processor configured to improve the capturing by using data derived from the gated images and the gating parameters.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

A preferred gated imaging system known in the art is described in U.S. Pat. No. 7,733,464 B2, titled "vehicle mounted night vision imaging system and method". Light source pulse (in free space) is defined as:

$$T_{Laser} = 2 \times \left( \frac{R_0 - R_{min}}{c} \right),$$

where the parameters defined in index below. Gated camera ON time (in free space) is defined as:

$$T_{II} = 2 \times \left(\frac{R_{max} - R_{min}}{c}\right),$$

Gated camera OFF time (in free space) is defined as:

$$T_{Off} = \frac{2 \times R_{min}}{c},$$

where c is the speed of light, $R_0$, $R_{min}$ and $R_{max}$ are specific ranges. The gated imaging is utilized to create a sensitivity as a function of range through time synchronization of $T_{Laser}$, $T_{II}$ and $T_{Off}$.

Hereinafter a single "Gate" (i.e. at least a single light source pulse illumination followed by at least a single camera/sensor exposure per a single readout) utilizes a specific $T_{Laser}$, $T_{II}$ and $T_{Off}$ if timing as defined above. Hereinafter "Gating"/"Gating parameters" (i.e. at least a single sequences of; a single light source pulse illumination followed by a single camera/sensor exposure and a single light source pulse illumination followed by a single camera/sensor exposure ending the sequence a single readout) utilizes each sequence a specific $T_{Laser}$, $T_{II}$ and $T_{Off}$ as defined above. Hereinafter Depth-Of-Field ("Slice") utilizes at least a single Gate or Gating providing a specific accumulated imagery of the viewed scene.

A stereo gated imaging and ranging system at daytime conditions, for nighttime conditions and in poor visibility conditions. In addition, to enable target detection (i.e. any type of object such as car, motorcycle, pedestrian etc.) in high probability with low false detection based on a selectively Depth-Of-Field ("Slice") and/or stereo imaging characteristics in real time with an automatic alert mechanism conditions regarding accumulated targets. The stereo gated imaging system may be handheld, mounted on a static and/or moving platform. Stereo gated imaging system may even be used in underwater platforms, ground platforms or air platforms. The preferred platform for the stereo gated imaging system herein is vehicular.

Illumination parameters comprise at least one of: $T_{Laser}$, amplitude of the pulse, duration of the pulse, frequency of the pulses, shape of the pulse, phase of the pulse, and duty cycle of the pulses.

Sensors parameters comprise at least one of: $T_{II}$, $T_{Off}$, gain, duration of the exposure, frequency of the exposures, raise/fall time of the exposure, polarization of the accumulated pulse, and duty cycle of the exposures. These parameters may be applicable to the entire sensor/camera array or applicable to parts of the sensor/camera array.

Figure 1:
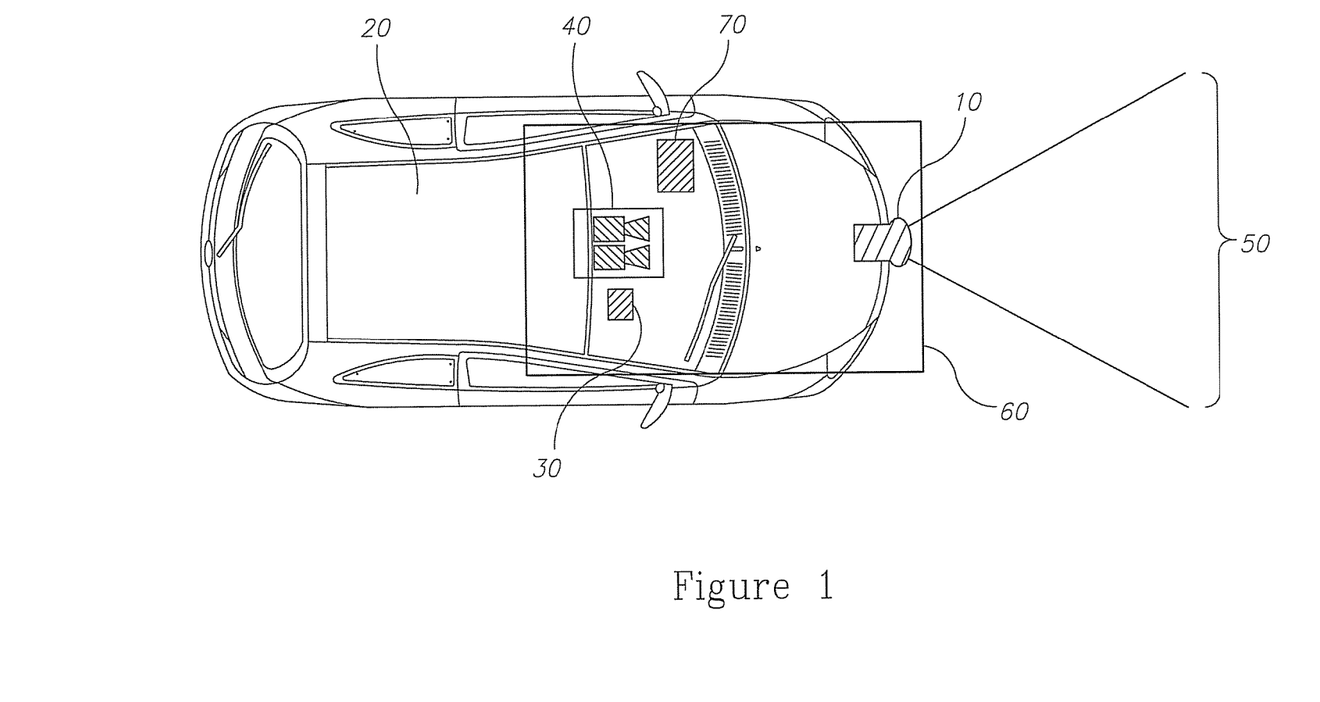
FIG. 1 is a top view illustration of a general view of the stereo gated imaging system installed in a vehicle according to some embodiment of the present invention.
Figure 2:
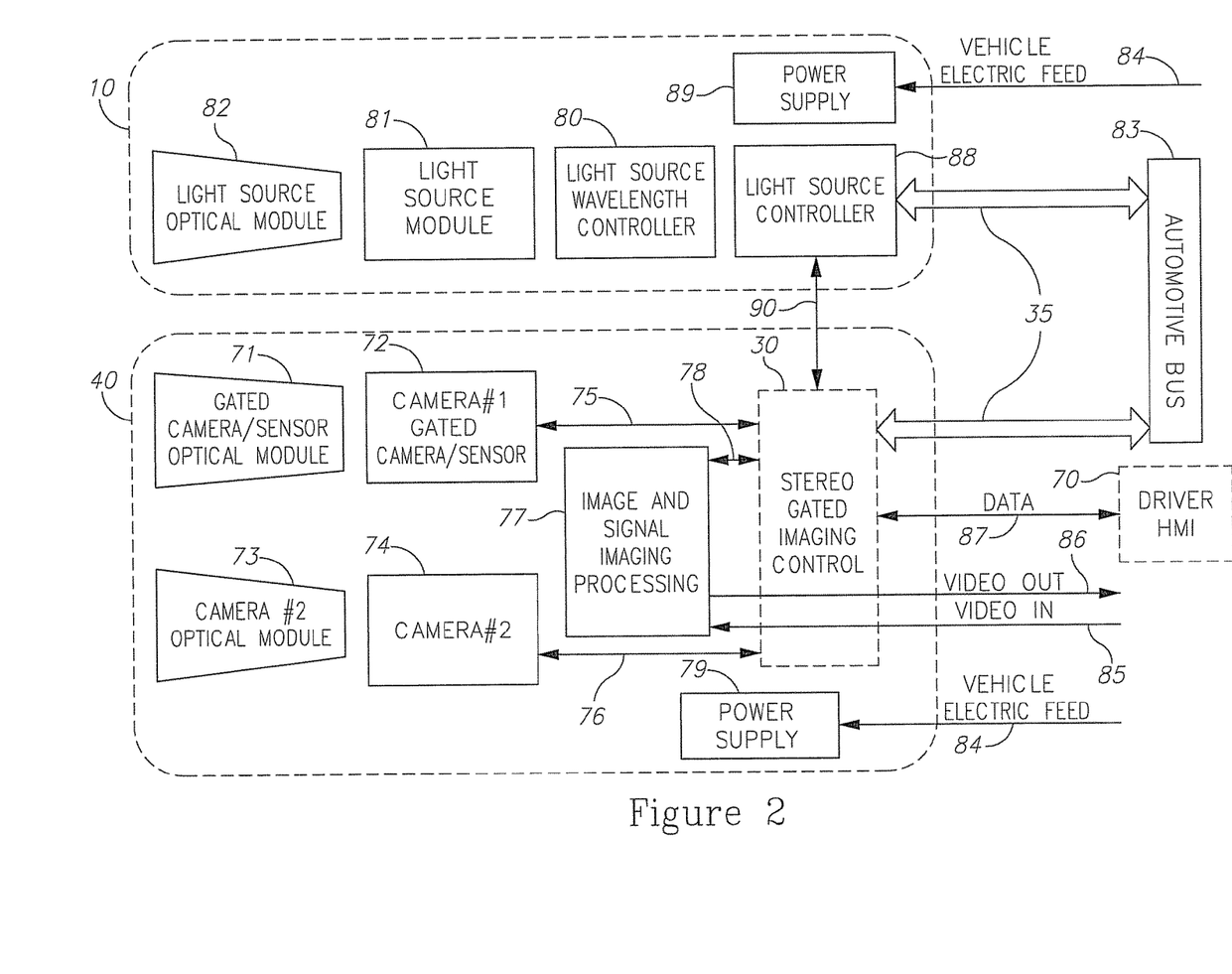
FIG. 2 describes a stereo gated imaging system block diagram in accordance with some embodiments of the present invention.

FIG. 1 and FIG. 2 illustrate a vehicle mounted stereo gated imaging and ranging system 60 which may include at least a single gated (pulsed) light source 10 in the non-visible spectrum (e.g. NIR by a LED and/or laser source) in order to illuminate, for example, the environment in front 50 of the vehicle 20. Furthermore, stereo gated imaging and ranging system may also include at least two cameras/sensors 40 whereas at least one camera/sensor is adapted for image gating. Stereo gated imaging cameras may be located internally in the vehicle behind the mirror in the area cleaned by the windshield wipers. Gated camera/sensor may be an intensified-CCD, intensified-CMOS (where the CCD/CMOS is coupled to an image intensifier), electron multiplying CCD, electron bombarded CMOS, hybrid FPA (CCD or CMOS where the camera has two main components; Read-Out Integrated Circuits and an imaging substrate), avalanche photo-diode FPA etc. Preferred gated camera/sensor may be based on a Gated Complementary Metal Oxide Semiconductor (GCMOS), where the gating mechanism/method is accomplished in the CMOS pixel level (i.e. single to multiple pixel exposures per single pixel readout). Furthermore, accumulated signal by the pixel multiple exposures/gating must overcome the pixel readout noise. Second camera/sensor may be a gated and/or non-gated and/or different from gated camera/sensor with respect to at least one property such as exposures/gating timing, sensitivity, spectral response, polarization response, dynamic range, resolution etc. Stereo gated imaging and ranging system 60 may further include a system control 30 and a driver Human Machine Interface (HMI) 70 such as a visual and/or tactile and/or sound to the system automatic alerts such as pedestrian detection warnings, cyclist detection warnings etc.

In one variant of the preferred exemplary embodiment, the stereo gated imaging (i.e. at least one camera/sensor and/or at least one gated light source) may be mounted externally on the motor vehicle in an unified volume such as; in the vehicle grill and/or as a separate vehicle headlamp and/or integrated vehicle headlamp and/or in at least one vehicle side mirror. Another installation method may be dividing the stereo gated imaging to sub-assemblies where each sub-assembly maybe located in a different place on the vehicle as described hereinabove (e.g. at least one camera/sensor in one location and/or at least one gated light source in another location). Even in these external installations, the gated imaging cameras/sensors are also immune to the backscattering due to the gating region (i.e. $T_{Off}$). Furthermore, vehicle windshield may transmit less than 40% in the NIR spectrum which requires an imaging system to compensate on this loss. External mounting (i.e. without the vehicle windshield) provides an adequate solution for the low spectral transmission.

Thermal camera/sensor based on emitted radiation sensing (cooled and un-cooled such as; InSb, HgCdTe, $V_2O_5$, amorphous silicon etc.) cannot be placed behind a standard vehicle windshield due to low to none radiation transmission in the required spectrum. A stereo gated imaging externally mounted (i.e. not behind a standard vehicle windshield) consisting of; at least a single gated imaging camera/sensor, at least a single gated source of light and at least a single thermal camera/sensor provides an ideal configuration; indifference to backscattering by the gated camera/light source and high spectral transmission in all used wavelengths (i.e. 400-14,000 nm).

FIG. 2 illustrates stereo gated imaging and ranging system 60 internal modules regarding disclosed embodiment. Accordingly, stereo gated imaging cameras 40 includes at least two cameras; camera #1-gated camera/sensor 72 and camera #2 74. Gated camera/sensor optical module 71 is adapted to operate and detect electromagnetic wavelengths similar to those provided by gated light source 10. Gated camera/sensor optical module 71 is further adapted for focusing incoming light onto light sensitive area of the camera #1-gated camera/sensor 72. Gated camera/sensor optical module 71 is further adapted for filtering certain wavelength spectrums, as may be performed by a band pass filter and/or adapted to filter various light polarizations. Camera/sensor optical module 73 is adapted to operate and detect electromagnetic wavelengths similar to those provided by gated light source 10 and/or also in the visible spectrum (i.e. 450-650 nm). Camera/sensor optical module 73 is further adapted for focusing incoming light onto light sensitive area of the camera #2-camera/sensor 74. Gated camera/sensor optical module 73 may include certain wavelength spectrum filtering, as may be performed by a band pass filter and/or include light polarizations filter. Further, camera #1-gated camera/sensor 72 adapted and enabled to detect electromagnetic modulation—including a synchronization mechanism adapted for detecting electromagnetic signals, originating from the gated or modulated light source 10. Stereo gated imaging cameras 40 further includes an image and signal processing 77, a stereo gated imaging control 30 (may be located separately from gated imaging cameras 40), and an electrical interface 35, adapted to interface with the motor vehicle communication bus 83. Stereo gated imaging control 30 provides the gating synchronization of the cameras gating/exposures (via controls 75 and 76) to the gated light source 10 pulses via triggering and control 90 and provides system parameters (via 78) to the image and signal processing 77. System parameters provide to image and signal processing 77 may include vehicle parameters (e.g. vehicle speed, wipers operating etc.) and/or other parameters (e.g. number of pulses/exposures per frame, cameras/sensors gain, timing etc.). Image and signal processing 77 may combine (fuse) images from camera/sensor 72 and/or camera/sensor 74 and/or additional images from external sensors via video in 85. Image and signal processing 77 may further provide real-time image processing (computer vision) such as ADAS features (e.g. pedestrian detection, lane departure warning, traffic sign recognition, object range estimation etc.). Additional interfaces are provided such as ADAS features output via vehicle communication bus 35, data interface 87 to the driver HMI 70 and video out 85 of the stereo gated imagining system. The video out 85 may have ADAS features overlay highlighting (e.g. for pedestrian detection warning a bordering rectangular, overlay lines for lane detection warning etc.). Power supply 79 (which is feed via vehicle electrical feed 84) provides gated stereo imaging cameras 40 and control 39 the required voltages.

In another embodiment, HMI 70 such as a visual based may include range estimation to imagery targets in the cameras FOV based on geometrical considerations and/or gated imagery (i.e. based on specific gating/exposures timing of at least one of the stereo gated imaging cameras 40 and the gated light source 10). Furthermore, visual display of the stereo gated imagery maybe based on the velocity of the vehicle 20; where the displayed stereo image is zoomed-in for higher velocities (for example above 50 km per hour) and zoomed-out for lower velocities (for example less than 50 km per hour).

FIG. 2 illustrates also at least a single gated light source 10 in the non visible spectrum (i.e. 750-2,000 nm) includes light source optical module 82, adapted for projecting and/or filtering light polarization. Light source optical module 82 may further be adapted for diffusing light (e.g. holographic diffuser, optical lenses etc.) and projecting one or more Field Of illumination (FOI). Gated light source 10 further includes a pulsed and/or modulated light source 81 (e.g. LED, LASER, flash lamp, etc.) to provide pulsed illumination or to provide modulated illumination. Gated light source 10 may include a light source wavelength controller 80 based on an electrical method (e.g. thermo electric cooler), and/or suitable mechanical method and/or any optical method and device for stabilizing illumination wavelengths, as appreciated by those having ordinary skill in the art. Gated light source 10 further includes light source controller 88 and power supply 89 which is feed via vehicle electrical feed 84. Light source controller 88 is adapted to drive pulsed or modulated illumination, adapted to control light source wavelength controller 80 and to receive trigger signal from stereo gated imaging control 30. Gated light source 10 may further include communication interface 35 to the vehicle communication bus 83 adapted to control and/or provide built-in-tests status.

Figure 3:
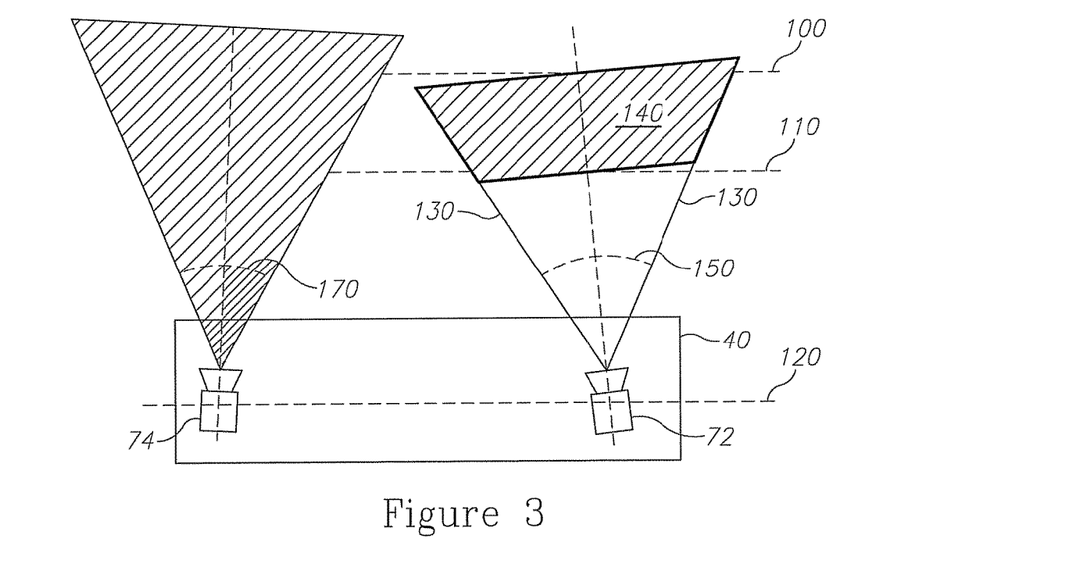
FIG. 3 and FIG. 4 describe schematically an example of an embodiment of the stereo gated imaging system Depth-Of-Field (DOF) in accordance with some embodiments of the present invention.

FIG. 3 illustrates stereo gated cameras 40 accumulated viewed scenery. Stereo gated cameras 40 comprise of at least a single gated camera/sensor 72 and at least a second camera/sensor 74. Gated camera/sensor 72 may absorb the energy of a projected gated (pulsed) light source 10 in the gated camera/sensor FOV 150. Gated camera/sensor 72 may absorb the energy of the full Depth-Of-Field (outlined by 130 and 100). Gated camera/sensor 72 may also accumulate at least a single selectively illuminated scene Depth-Of-Field ("Slice") 140 (outlined by 130, 100 and 110) reflections from the non-visible gated light source 10 (i.e. based on different timing of $T_{Laser}$, $T_{II}$ and $T_{Off}$). Camera/sensor 74 may be a non-gated (i.e. not synchronized to gated light source 10) sensitive in the spectrum of the non-visible gated light source 10. Camera/sensor 74 may absorb gated light source 10 reflections providing a full FOV 170 accumulated imagery. In this method (configuration), camera/sensor 74 exploits the light source 10 illumination to provide an enhance imagery (i.e. better SNR at longer distances). Camera/sensor 74 may be a non-gated (i.e. not synchronized to gated light source 10) sensitive in the visible spectrum (i.e. may not sense the non-visible gated light source 10). Camera/sensor 74 may absorb ambient light such as; originating from the vehicle 20 head lights, ambient street light and any other method of illumination. In this method system 60 has two types of ranges: a first range which yields said stereoscopic fused images up to the vehicle 20 head lights pattern, and a second range which yields monoscopic gated images above the vehicle 20 head lights pattern.

Figure 4:
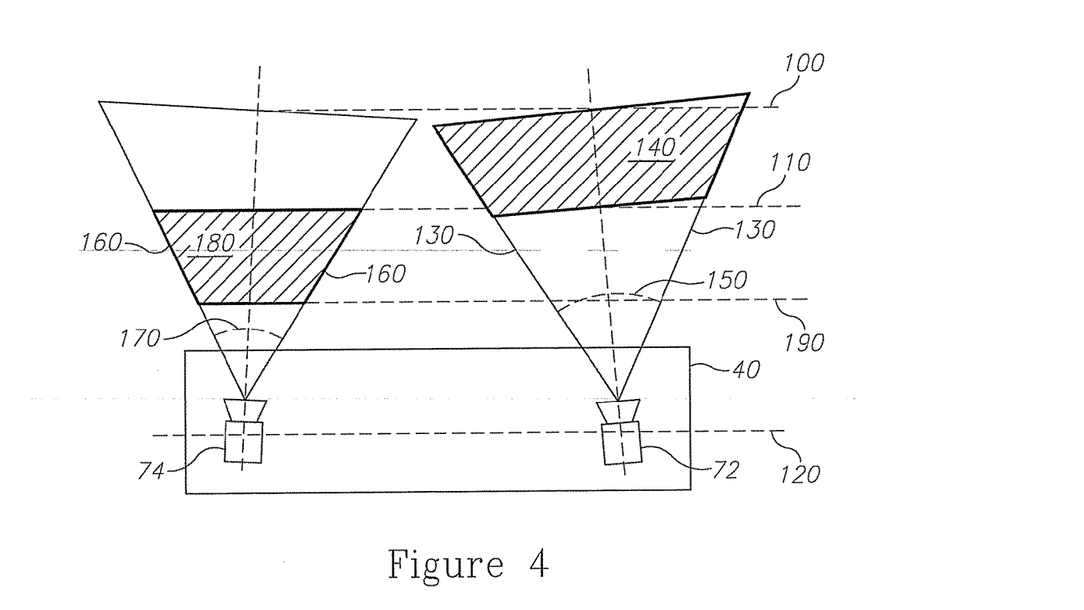

FIG. 4 illustrates stereo gated cameras 40 accumulated viewed scenery (i.e., based on accumulated images). Stereo gated cameras 40 comprise of at least two gated cameras/sensors 72 and 74. Gated cameras/sensors 72 may absorb the energy of a projected gated (pulsed) light source 10 in the gated cameras/sensors FOV 150 and 170. Each gated camera/sensor (72 or 74) is synchronized to each other and to the gated light source 10. Each gated camera/sensor (72 or 74) may absorb the energy of the full Depth-Of-Field (outlined by 130 and 100 or outlined by 160 and 100 respectively). Each gated camera/sensor (72 or 74) may also accumulate at least a single selectively illuminated scene Depth-Of-Field ("Slice") 140 (outlined by 130, 100 and 110) or 180 (outlined by 160, 190 and 110) reflections from the non-visible gated light source 10.

Furthermore, a 'straight forward' approach to provide the required specific timing for each gated camera/sensor (72 and 74) may include an increase of gated light source 10 overall duty cycle (i.e. number of pulses in a certain period of time) by adding additional gated light sources and/or by adding more pulses of light for the single gated light source. This approach may increase blooming to other vision systems operating the same spectrum facing the stereo gated imaging system.

Figure 5:
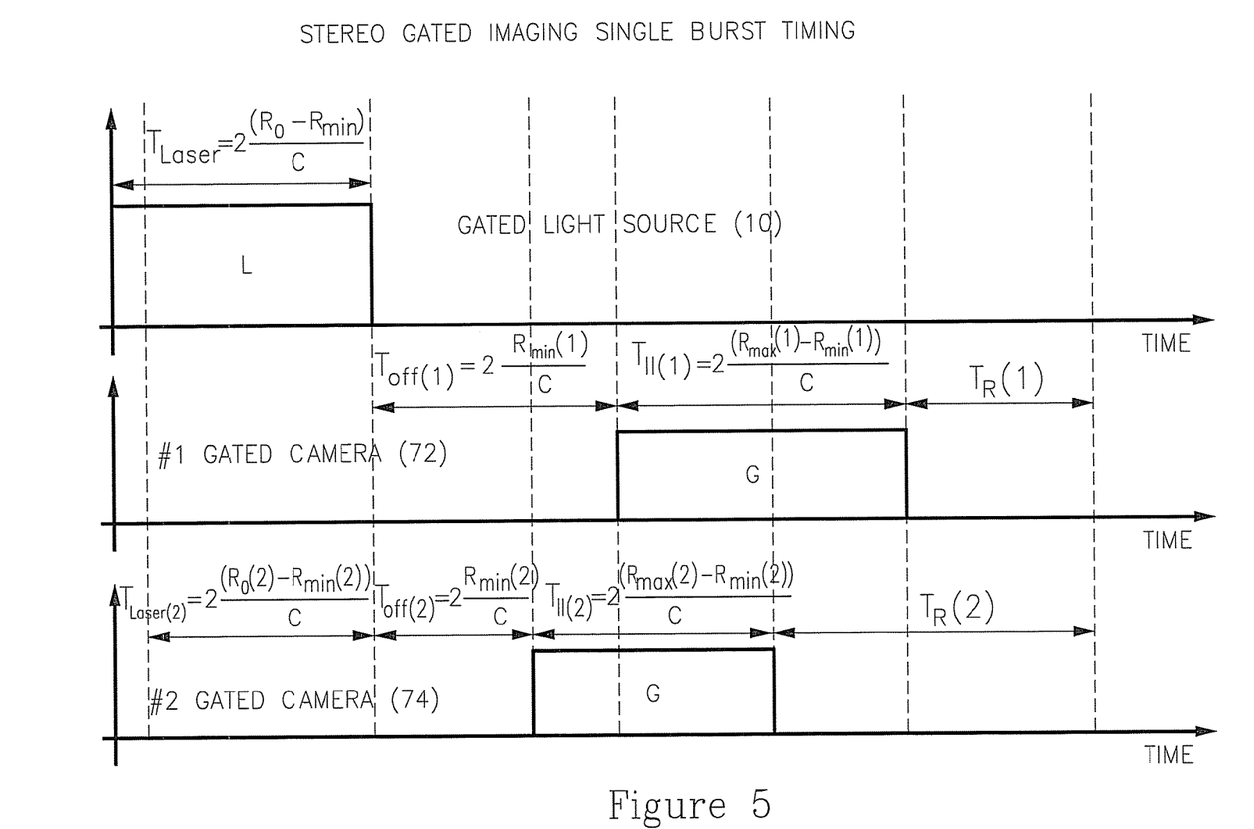
FIG. 5 describes stereo gated imaging single burst timing in accordance with some embodiments of the present invention.

Another preferred method provides a similar duty cycle as to a single gated camera configuration but providing an option for different DOF for each gated camera/sensor. FIG. 5 illustrates stereo gated imaging single burst timing for at least two gated cameras/sensors. The system laser pulse duration $T_{Laser}$ (indicated L in the upper timing scheme) is defined $T_{Laser} = \max(T_{Laser(1)}, T_{Laser(2)})$, where $$T_{Laser(1)} = 2 \times \left( \frac{R_0(1) - R_{min}(1)}{c} \right)$$

is the pulse duration as related to gated camera/sensor #1 and $$T_{Laser(2)} = 2 \times \left( \frac{R_0(2) - R_{min}(2)}{c} \right)$$

is the pulse duration as related to gated camera/sensor #2. Synchronization timing for two gated cameras/sensors 72 and 74 includes the following DOF options:

Option 1: $T_{II(1)} \neq T_{II(2)}$ and $T_{Off(1)} \neq T_{Off(2)}$, DOF for each gated camera/sensor is different and DOF for each gated camera/sensor starting range (distance) is different.

Option 2: $T_{II(1)} = T_{II(2)}$ and $T_{Off(1)} \neq T_{Off(2)}$, DOF for each gated camera/sensor is same where DOF for each gated camera/sensor starting range (distance) is different.

Option 3: $T_{II(1)} \neq T_{II(2)}$ and $T_{Off(1)} = T_{Off(2)}$, DOF for each gated camera/sensor is different where DOF for each gated camera/sensor starting range (distance) is same.

Option 4: $T_{II(1)} = T_{II(2)}$ and $T_{Off(1)} = T_{Off(2)}$, DOF for each gated camera/sensor is same where DOF for each gated camera/sensor starting range (distance) is same.

$T_{II(1)}$, $T_{II(2)}$ exposure time are indicated G in the middle and lower timing scheme.

$T_{R(1)}$, $T_{R(2)}$ are the relaxation time for each camera/sensor and gated light source 10 until the next burst cycle begins.

The following table provides two examples of a gated stereo imaging system timing for different selectively accumulated DOF ("Slice").

|  | Parameter | Gated Camera/sensor 72 | | Gated Camera/sensor 74 | |
|---|---|---|---|---|---|
|  |  | Full Depth-Of-Field (DOF) | Selectively DOF ("Slice") | Full DOF | Selectively DOF ("Slice") |
| Ex am | $R_{max}$ [meters] | 250 | 150 | 250 | 100 |
|  | $R_0$ [meters] | 100 | 50 | 100 | 35 |
|  | $R_{min}$ [meters] | 20 | 20 | 20 | 5 |
|  | $T_{Laser}$ [nsec] | 530 | 200 | 530 | 200 |
|  | $T_{II}$ [nsec] | 1530 | 870 | 1530 | 630 |
|  | $T_{off}$ [nsec] | 130 | 130 | 130 | 30 |
| Example #2 | $R_{max}$ [meters] | 300 | 150 | 190 | 100 |
|  | $R_0$ [meters] | 250 | 50 | 190 | 90 |
|  | $R_{min}$ [meters] | 50 | 20 | 10 | 80 |
|  | $T_{Laser}$ [nsec] | 1333 | 200 | 1200 | 67 |
|  | $T_{II}$ [nsec] | 1667 | 870 | 1200 | 133 |
|  | $T_{off}$ [nsec] | 334 | 130 | 67 | 533 |

Stereo gated imaging cameras FOV and/or gated source of light may be moved during operation as a function of observed scene. For example, in a scene where the viewed road is upwards the stereo gated system may be rotated upwards and for a right curved road the gated system may be rotated right in a similar angle as the road curvature. Stereo gated imaging rotation may be controlled via a mechanical construction, an electro-mechanical engine, an electro-optical construction etc.

A problem exists off capturing a single image (single frame read-out) of a light-modulated or pulsed light source target (such as a Pulse Wide Modulation LEDs in a traffic sign or in vehicle lighting etc.). The stereo gated imaging system provides a solution by capturing this light-modulated or pulsed light source target. The technique may utilize at least one of systems' gated cameras without the need of the gated light source. By "locking" on the modulation frequency (e.g. opening specific gates and probing for a signal which is directly related to the modulation frequency of the external light source target) and/or by system gated camera multiple gates with different length time exposures (i.e. without "knowing" modulation frequency of the light source target) per frame read-out. At least a single gated camera/sensor shall have a specified exposure parameters that may include the change of at least a single parameter between each exposure per frame read-out; exposure duration or exposure delay to next exposure. In addition specified exposure parameters may also include the amount of exposures per each frame.

Such stereo gated imaging system might overcome the problems of imaging sensor blooming during high intensity ambient light level (e.g. during daytime, high or low front headlight of incoming vehicle during nighttime etc.) by short gates (i.e. exposure time\light accumulating) of the gated camera which are directly related to lowering the numbers of gates per frame read-out and/or narrowing the gates length time and/or lowering the gated camera gain. For example enabling a dynamic range of 110 dB between frame to consecutive frame where the first frame has a single exposure of 50 nsec and the consecutive frame has a single exposure of 16 msec.

Preferably, at least a single gated camera in the stereo gated imaging is produced using CMOS technology which complies with vehicular environment; high temperature storage and operation (above 50 deg Celsius), sensitivity is not damaged due to solar irradiance, no burn effect due to a constant static image projection to the cameras.

Preferably, a spectral filter is introduced in front of at least one of the stereo gated imaging cameras to reduce ambient light accumulation at daytime, nighttime and other ambient light conditions.

Preferably, a polarization filter is introduced in front of at least one of the stereo gated imaging cameras to reduce ambient light accumulation at daytime, nighttime and other ambient light conditions from highly polarized light and/or to provide another layer of information of the viewed scene (i.e. polarimetry; seeks to measure information about the vector nature of the optical field across a scene to provide information about surface features, shape, shading, and roughness).

Another preferred method provides the ability to conduct a direct Time Of Flight (TOF) ranging and imaging with a synchronized gated source of light reflected back to at least one of the system cameras by multiple exposures for a single pulse of the gated source of light in a single camera frame read-out.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:
1. A method of capturing images of a scene comprising:
   illuminating the scene with a pulsed light from a pulsed light source of non-visible light at a specified direction based on predefined gating parameters;
   capturing images of said scene from at least two different spatial locations using respective capturing devices to provide stereoscopic images, wherein at least one of the capturing devices is also configured to be synchronized with said pulsed light;

accumulating at least one selectively illuminated scene Depth-Of-Field slice by said at least one capturing device synchronized with said pulsed light using reflections from the light source to provide a monoscopic gated image;

fusing images from the capturing devices so as to result in stereoscopic fused images of said scene for the synchronized capturing; and deriving a range of one or more objects in the scene based on data in the stereoscopic images and the monoscopic gated image.

2. The method according to claim 1, wherein the capturing is carried out in a first range which yields said stereoscopic fused images, and a second range which yields said monoscopic gated image.

3. The method according to claim 1, wherein at least one of the capturing is not synchronized with the pulsed light.

4. The method according to claim 1, wherein the capturing is synchronized with the pulsed light so that a first capturing is synchronized based on first set of gating parameters and a second capturing is synchronized based on a second set of gating parameters.

5. The method according to claim 1, further comprising analyzing the captured images and repeating the capturing with updated sets of sensor gating parameters affecting the synchronization, based on the analysis.

6. The method according to claim 1, further comprising analyzing the captured images and repeating the illuminating of the scene with updated sets of parameters affecting the gating.

7. The method according to claim 1, further comprising deriving a range of one or more objects in the scene based on data fusion between the stereoscopic images and the monoscopic gated images.

8. The method according to claim 1, wherein the capturing is carried out in multispectral ranges.

9. The method according to claim 1, wherein the illuminating and the capturing is carried out in polarized light.

10. The method according to claim 1 used to determine the distance of one or more objects from a vehicle, wherein at least one of the illuminating and the capturing is carried out outside of a vehicle.

11. A system for capturing images of a scene comprising:
a light source configured to illuminate the scene with non-visible pulsed light at a specified direction based on predefined gating parameters;
two or more capturing devices configured to capture images of the scene from different spatial locations to provide stereoscopic images, wherein at least one of the capturing devices is also configured to be synchronized with the pulsed light to accumulate at least one selectively illuminated scene Depth-Of-Field slice using reflections from the light source to provide a monoscopic gated image; and
a computer processor configured to:
fuse images from the capturing devices so as to result in stereoscopic fused images of said scene for the synchronized capturing; and
derive a range of one or more objects in the scene based on data in the stereoscopic images and the monoscopic gated image.

12. The system according to claim 11, configured to carry out the capturing in two ranges: a first range which yields said stereoscopic fused images, and a second range which yields said monoscopic gated image.

13. The system according to claim 11, wherein at least one of the capturing devices is not synchronized with the pulsed light.

14. The system according to claim 11, wherein at least two of the capturing are synchronized with the pulsed light so that a first capturing is synchronized based on first set of gating parameters and a second capturing is synchronized based on a second set of gating parameters.

15. The system according to claim 14, wherein each one of the first and second sets of gating parameters corresponds with a different depth of field of the scene.

16. The system according to claim 11, wherein the computer processor is further configured to analyze the captured images and repeat the capturing with updated sets of gating parameters affecting the synchronization, based on the analysis.

17. The system according to claim 11, wherein the computer processor is further configured to derive a range of one or more objects in the scene based on data fusion between the stereoscopic images and the gated images.

18. The system according to claim 11, wherein at least one of the capturing devices is operable in multispectral ranges.

19. A method of capturing images of a scene comprising:
illuminating the scene with a pulsed light from a pulsed light source of non-visible light at a specified direction based on predefined gating parameters;
capturing images of said scene in a first range from at least two different spatial locations using respective capturing devices to provide stereoscopic images, wherein at least one of the capturing devices is also configured to be synchronized with said pulsed light;
accumulating at least one selectively illuminated scene Depth-Of-Field slice in a second range by said at least one capturing device synchronized with said pulsed light using reflections from the light source in to provide a monoscopic gated image;
fusing images from the capturing devices so as to result in stereoscopic fused images of said scene for the synchronized capturing; and
deriving a range of one or more objects in the scene based on data in the stereoscopic images and the monoscopic gated image.

20. A system for capturing images of a scene comprising:
a light source configured to illuminate the scene with non-visible pulsed light at a specified direction based on predefined gating parameters;
two or more capturing devices configured to capture images of the scene in a first range from different spatial locations to provide stereoscopic images, wherein at least one of the capturing devices is also configured to be synchronized with the pulsed light to accumulate at least one selectively illuminated scene Depth-Of-Field slice in a second range using reflections from the light source to provide a monoscopic gated image; and
a computer processor configured to:
fuse images from the capturing devices so as to result in stereoscopic fused images of said scene for the synchronized capturing; and
derive a range of one or more objects in the scene based on data in the stereoscopic images and the monoscopic gated image.

* * * * *